(12) United States Patent
Uchman

(10) Patent No.: US 6,626,581 B2
(45) Date of Patent: Sep. 30, 2003

(54) CONSTANT VELOCITY JOINT AND WHEEL HUB ASSEMBLY

(75) Inventor: Frederick J. Uchman, Clarkston, MI (US)

(73) Assignee: GKN Automotive, Inc., Auburn Hills, MI (US)

( * ) Notice: Subject to any disclaimer, the term of this patent is extended or adjusted under 35 U.S.C. 154(b) by 0 days.

(21) Appl. No.: 10/060,106

(22) Filed: Jan. 29, 2002

(65) Prior Publication Data

US 2003/0044099 A1 Mar. 6, 2003

Related U.S. Application Data

(63) Continuation-in-part of application No. 09/947,986, filed on Sep. 6, 2001, now Pat. No. 6,524,012.

(51) Int. Cl.[7] .............................. F16C 13/00; F16D 3/22
(52) U.S. Cl. ........................ 384/544; 384/903; 403/1; 403/19; 403/315; 403/319; 403/397; 464/178
(58) Field of Search ................. 384/544, 589, 384/561, 903, 539; 403/1, 19, 20, 397, 315, 319, 316, 355, 325; 411/517, 520, 521, 530; 464/178, 906

(56) References Cited

U.S. PATENT DOCUMENTS

| | | | | |
|---|---|---|---|---|
| 2,440,452 A | * | 4/1948 | Smith | 411/517 |
| 2,536,424 A | * | 1/1951 | Curtis | 384/217 |
| 2,760,258 A | * | 8/1956 | Rieger | 403/326 |
| 2,865,662 A | * | 12/1958 | Nurmse | 403/325 |
| 4,602,876 A | * | 7/1986 | Miki et al. | 384/585 |
| 6,193,419 B1 | | 2/2001 | Krude et al. | |
| 6,354,952 B1 | * | 3/2002 | Boulton et al. | 464/145 |
| 6,412,393 B1 | * | 7/2002 | Heitz | 384/903 |

FOREIGN PATENT DOCUMENTS

WO   WO 99/13232   3/1999

* cited by examiner

*Primary Examiner*—Thomas R. Hannon
(74) *Attorney, Agent, or Firm*—Mick A. Nylander

(57) ABSTRACT

An assembly including an outer race of a constant velocity joint and part of a vehicle wheel bearing. The outer race has a first bore and an internal groove in the bore, and the wheel bearing part has a second bore with an open end, an external groove, and a slot extending radially from the second bore between an inner end open to the second bore and an outer end at an external surface of the bearing part, the slot extending axially between the external groove and the open end. The wheel bearing part and the outer race are held in an assembled position by a spring ring engaged in the internal groove and the external groove. The spring ring includes, adjacent its ends, first and second arms which extend generally radially inward through the slot. The first arm is substantially longer than the second arm and inclined such that the first arm extends approximately through a center axis of the spring ring. A sealing element is also included to seal the second bore.

10 Claims, 10 Drawing Sheets

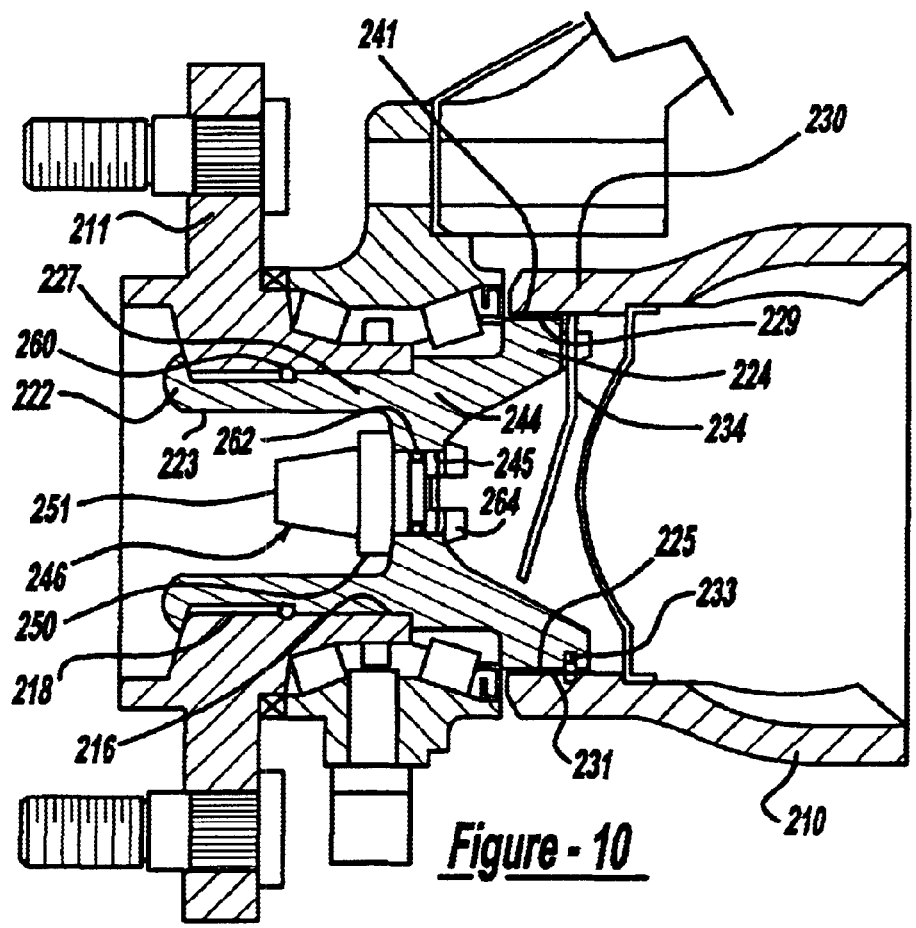
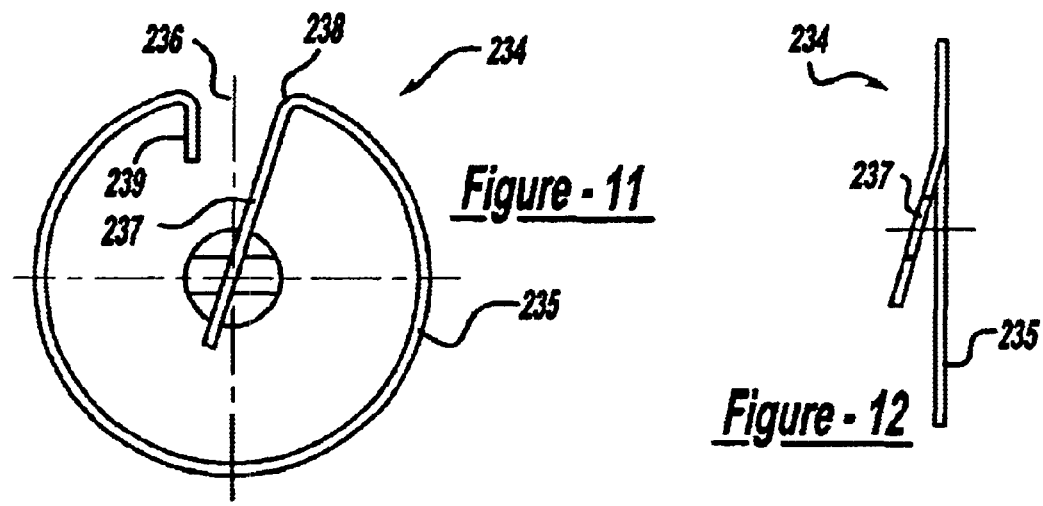
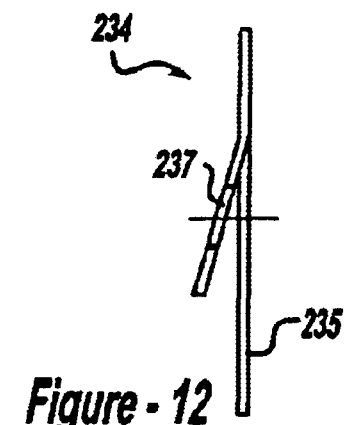
*Figure - 10*
*Figure - 11*
*Figure - 12*
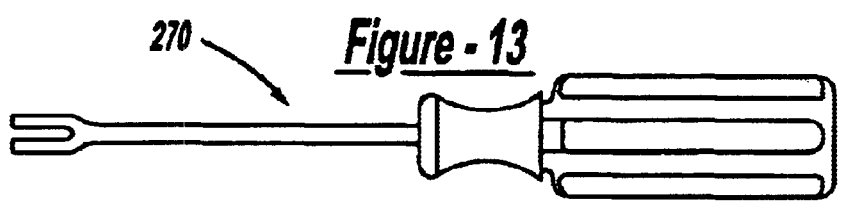
*Figure - 13*

CONSTANT VELOCITY JOINT AND WHEEL HUB ASSEMBLY

CROSS REFERENCE TO RELATED APPLICATION

This is a Continuation-In-Part of U.S. application Ser. No. 09/947,986 filed Sep. 6, 2001 now U.S. Pat. No. 6,524,012 entitled "Securing Members Together By Spring Rings."

TECHNICAL FIELD

This invention relates generally to the securing together against relative axial movement of two members in telescopic relation. The members are secured together by a spring ring which is received in cooperating grooves; an internal groove in the external member and an external groove in the internal member. In particular the invention relates to securing together the outer race of a constant velocity joint and part of a motor vehicle wheel bearing as well as a device for sealing the interface between the outer race and wheel bearing hub.

BACKGROUND OF THE INVENTION

Various proposals have been made for securing together the outer race of a constant velocity joint and part of a motor vehicle wheel bearing. Attention is drawn to U.S. Pat. No. 6,022,275 issued Feb. 8, 2000 to SKF Industrie S.p.A. and U.S. Pat. No. 6,193,419 issued Feb. 27, 2001 to GKN Automotive AG. Reference is also made to the publication WO99/13232 in the name of GKN Automotive AG. In this latter publication a spring ring is used which has arms at its ends which extend outwardly and these arms are embraced by a holding element which can hold the ring in one of the grooves while the parts are assembled and then removed to allow the ring to engage both grooves. Access to the holding element may be through the hole in the vehicle suspension knuckle which is normally used for an ABS sensor.

The area around the exterior of the wheel bearing is very confined and there is little space to manipulate the holding element.

SUMMARY OF THE INVENTION

It is an object of the present invention to provide an arrangement in which, when securing together the outer race of a constant velocity joint and a wheel bearing by means of a spring ring, the spring ring can be operated upon from the wheel side of the assembly and can thus allow easy assembly and disassembly of the parts in situ on a vehicle.

Another object of the invention is the provision of a sealing ring to seal the splined connection between the hub and the outer race of the constant velocity joint to prevent the ingress of road dirt etc. into the splined connection and the internal and external grooves.

According to one aspect of the invention we provide a method of securing together, by means of a spring ring, an external member in telescopic relation with an internal member, wherein the external member has a first bore and an internal groove in the first bore, wherein the internal member has an external groove, a second bore and a slot extending radially of the second bore between an inner end open to the second bore and an outer end at the external surface of the internal member, the slot extending axially between the external groove and an end of the internal member, wherein the spring ring is engaged in the grooves to secure the members together and has, adjacent to its ends, arms which extend generally radially inwardly. The method includes mounting the spring ring in the external groove so that the arms extend inwardly through the slot into the second bore, releasably holding the ring in a contracted state so that it lies substantially within the external groove by engaging the arms in the second bore with holding means, telescoping the members together while the arms are engaged with the holding means until the grooves in the members are mutually aligned and disengaging the holding means from the arms to release the ring so that the ring expands to engage in both of the mutually aligned grooves to secure the members together.

Preferably the external member is part of the outer race of a constant velocity joint and the internal member is part of a motor vehicle wheel bearing.

According to another aspect of the invention we provide an assembly of an outer race of a constant velocity joint and part of a motor vehicle wheel bearing, wherein the outer race has a first bore and an internal groove in the bore, the bearing part and the outer race being held in assembled position by a spring ring engaged in the groove and in an external groove of the bearing part which has a second bore with an open end, the ring having, adjacent its ends, arms which extend generally radially inwardly through a slot extending radially of the second bore between an inner end open to the second bore and an outer end at the external surface of the bearing part, the slot extending axially between said external groove and an end of the bearing part.

In this arrangement the inwardly projecting arms of the ring can be operated upon through the open end of the second bore and can be gripped so as to locate the ring wholly in the external groove on the wheel hub part or to allow the ring to expand so as to be located in both the internal and the external grooves.

A sealed connection is also provided including an outer race of a constant velocity joint and part of a vehicle wheel bearing. The outer race has a first bore and an internal groove in the bore, and the wheel bearing part has a second bore with an open end, an external groove, and a slot extending radially from the second bore between an inner end open to the second bore and an outer end at an external surface of the bearing part. The slot extends axially between the external groove and the open end. The wheel bearing part and the outer race are held in an assembled position by a spring ring engaged in the internal groove and the external groove. The spring ring includes, adjacent its ends, first and second arms which extend generally radially inward through the slot. The first arm is substantially longer than the second arm and inclined such that the first arm extends approximately through a center of the spring ring. A sealing element is also included to seal the second bore.

In another embodiment, a method of securing together the outer race of the constant velocity joint (external member) and wheel bearing hub (internal member) by a spring ring having the first arm substantially longer than the second arm is provided. The method includes mounting the spring ring in the external groove of the internal member so that the first arm extends inwardly through the slot into the second bore and the second arm engages the slot. The spring ring is then releasably held in a contracted state by a forked tool so that it lies substantially within the external groove. This is accomplished by engaging the first arm with a forked tool and rotating the first arm towards the second arm. The internal member is then inserted into the external member while the first arm is engaged and rotated towards the second arm until the internal and external grooves are mutually aligned. The first arm of the spring ring is then released so that that spring ring expands to engage both of the mutually aligned internal and external grooves. A sealing member is then inserted into the a bore of the internal member to seal the splined connection.

Other advantages of the invention will become apparent upon reading the following detailed description and appended claims, and upon reference to the accompanying drawings.

BRIEF DESCRIPTION OF THE DRAWINGS

The invention will now be described in detail with reference to the accompanying drawings which show various assemblies of a constant velocity joint outer race and a motor vehicle wheel bearing embodying the invention.

In the drawings:

FIG. 10 is a cross-section similar to FIG. 1 according to a fifth embodiment of the invention.

FIG. 11 is a front elevation view of another embodiment of the spring ring according to the present invention.

FIG. 12 is a side elevation view of the spring ring of FIG. 11.

FIG. 13 is a front elevation view of a tool for use with the spring ring of FIGS. 11 and 12.

DETAILED DESCRIPTION OF THE INVENTION

Figure 1:
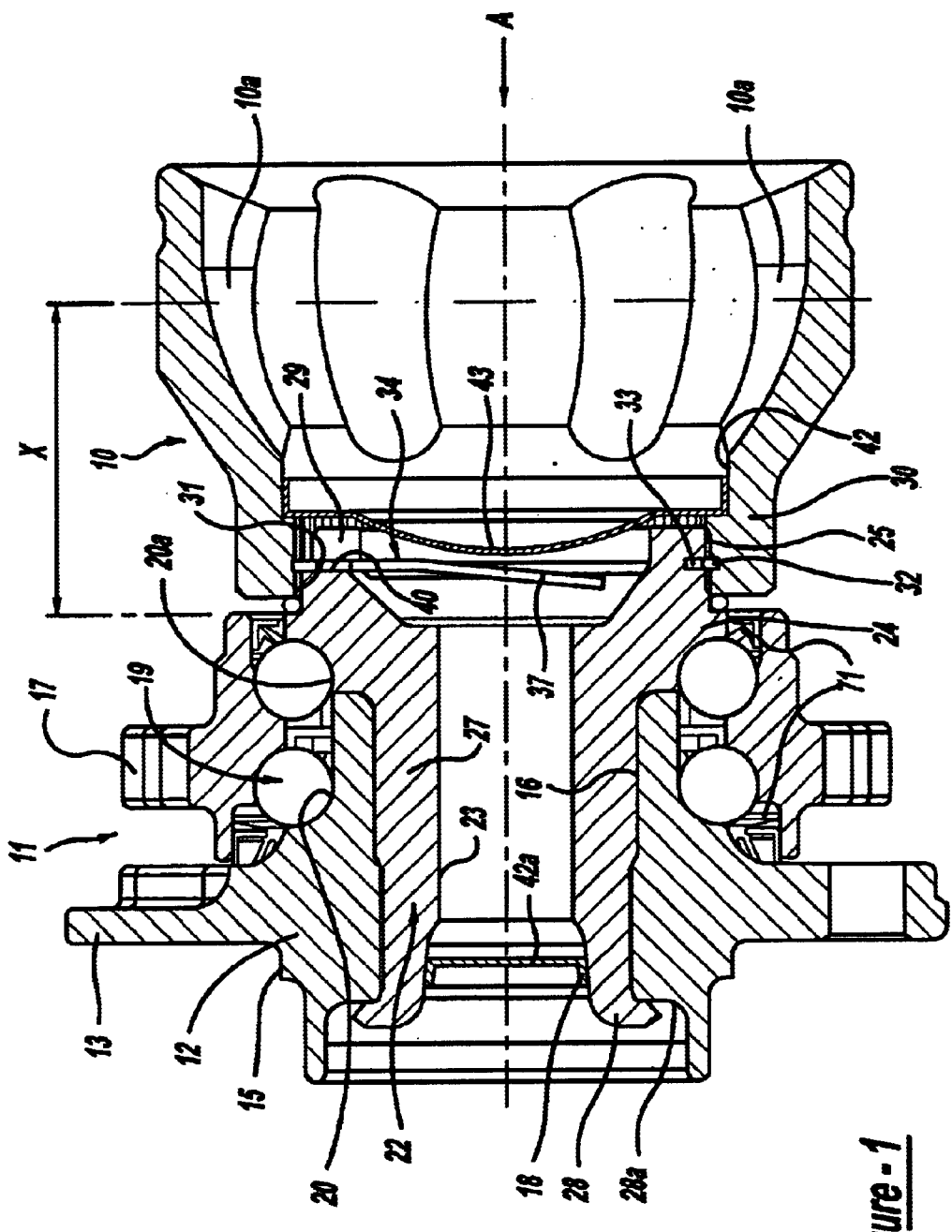
FIG. 1 is a vertical cross-section through a wheel bearing and outer race of a constant velocity joint assembly according to a first embodiment of the invention.

Referring first to FIG. 1, there is shown an assembly of the outer race 10 of a constant velocity joint and a motor vehicle wheel bearing assembly indicated generally at 11. The assembly 11 includes a hub 12 having a flange 13 which carries bolts (not shown) to receive a vehicle road wheel (not shown) which is located on a spigot 15. The hub has a bore 16 and is rotatably mounted in a fixed part 17 which may be connected by bolts, not shown, to a suspension knuckle of a vehicle. There is a rolling element bearing 19 between the hub 12 and the fixed part 17. In the example shown, the bearing is a double-ball bearing, but may alternatively be a roller bearing. The outer races of the bearing are formed directly in the fixed part 17. The inner race of one of the bearing rows is indicated at 20 and is formed on the hub itself. The inner race of the other bearing row is indicated at 20a and is formed on a tubular securing element 22.

The tubular securing element 22 has a bore 23 and serves to pre-load the bearing 19 via the bearing race 20a and to locate the hub 12. At its right-hand end in FIG. 1, the securing element has a flange 24, the outer surface of which is splined at 25. A tubular part 27 of the securing element passes through the bore 16 of the hub and at its left-hand end is swaged outwardly at 28 to engage a surface 28a on the hub. As the swaging takes place, a load is applied to the securing element so that it loads the bearing race 20a and thus pre-loads the bearing 19. The bore 16 of the hub 12 and the tubular part 27 of the securing element have inter-engaging splines 18.

The outer race 10 of the constant velocity joint has ball tracks 10a and a tubular neck portion 30 defining an opening which is internally splined at 31. The splines 31 in the neck portion of the outer race engage the splines 25 on the flange 24. The outer race 10 will also contain an inner race, cage and balls (not shown).

Figure 9:
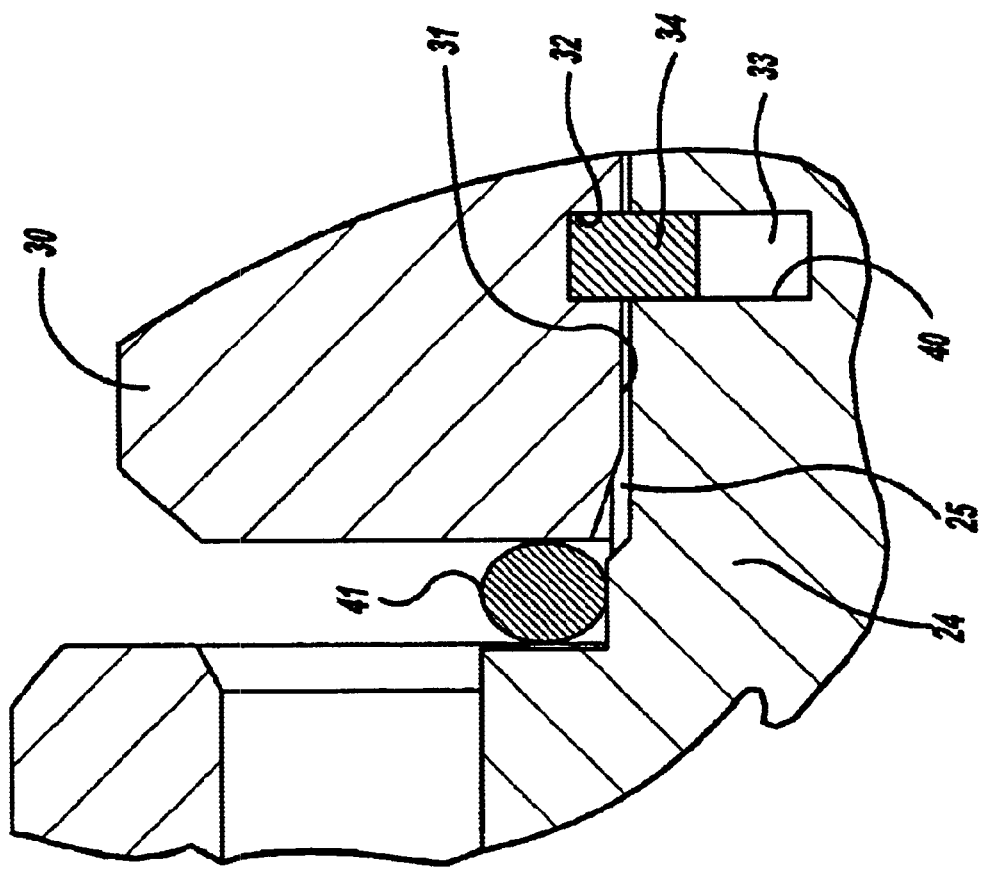
FIG. 9 shows the sealing ring and how the spring ring engages the internal and external grooves.

Referring to FIG. 9, the neck portion 30 of the outer race is provided with an internal groove 32 while the flange 24 is provided with an external groove 33. A spring ring 34 secures the parts together as will now be described.

Figure 6:
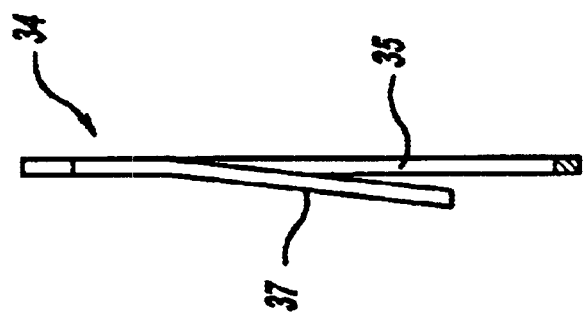
FIG. 6 is a section of the ring of FIG. 5 on the line 6—6 of FIG. 5.
Figure 5:
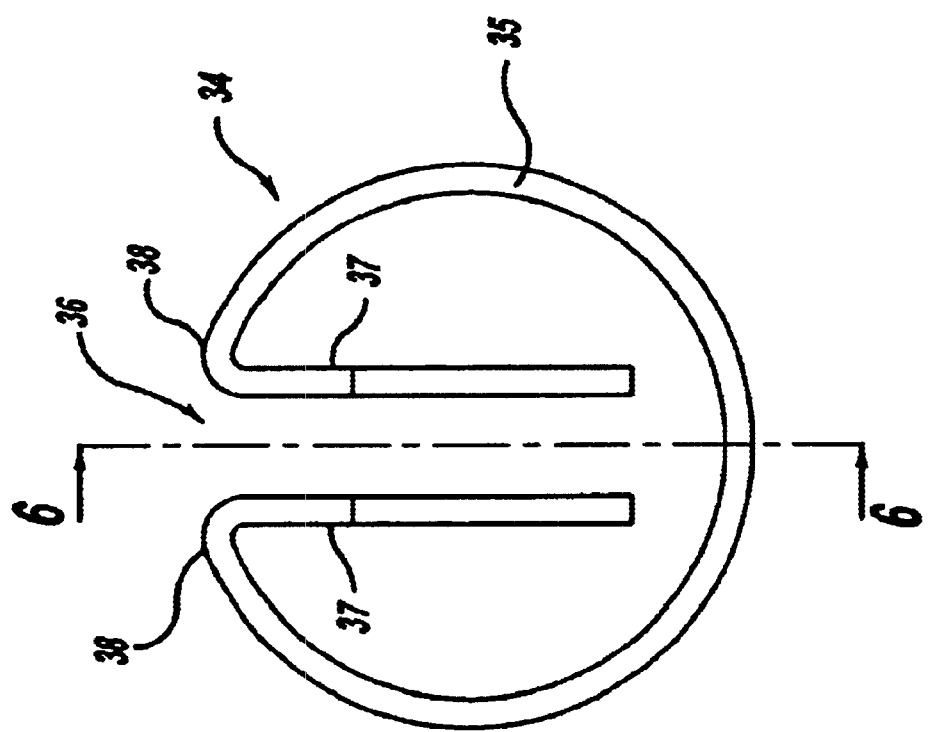
FIG. 5 is a front elevation of the spring ring for use in the various embodiments.

The ring is shown in more detail in FIGS. 5 and 6. The ring includes a generally circular part 35 which is not a complete circle but has a gap 36. At the ends 38 of the circular part, the ring has arms 37 which project generally radially inwardly. As shown in FIG. 6, the arms 37 lie in a plane which is inclined to the plane which contains the circular portion 35. However, the arms could be in the same plane as the rest of the ring.

Figure 2:
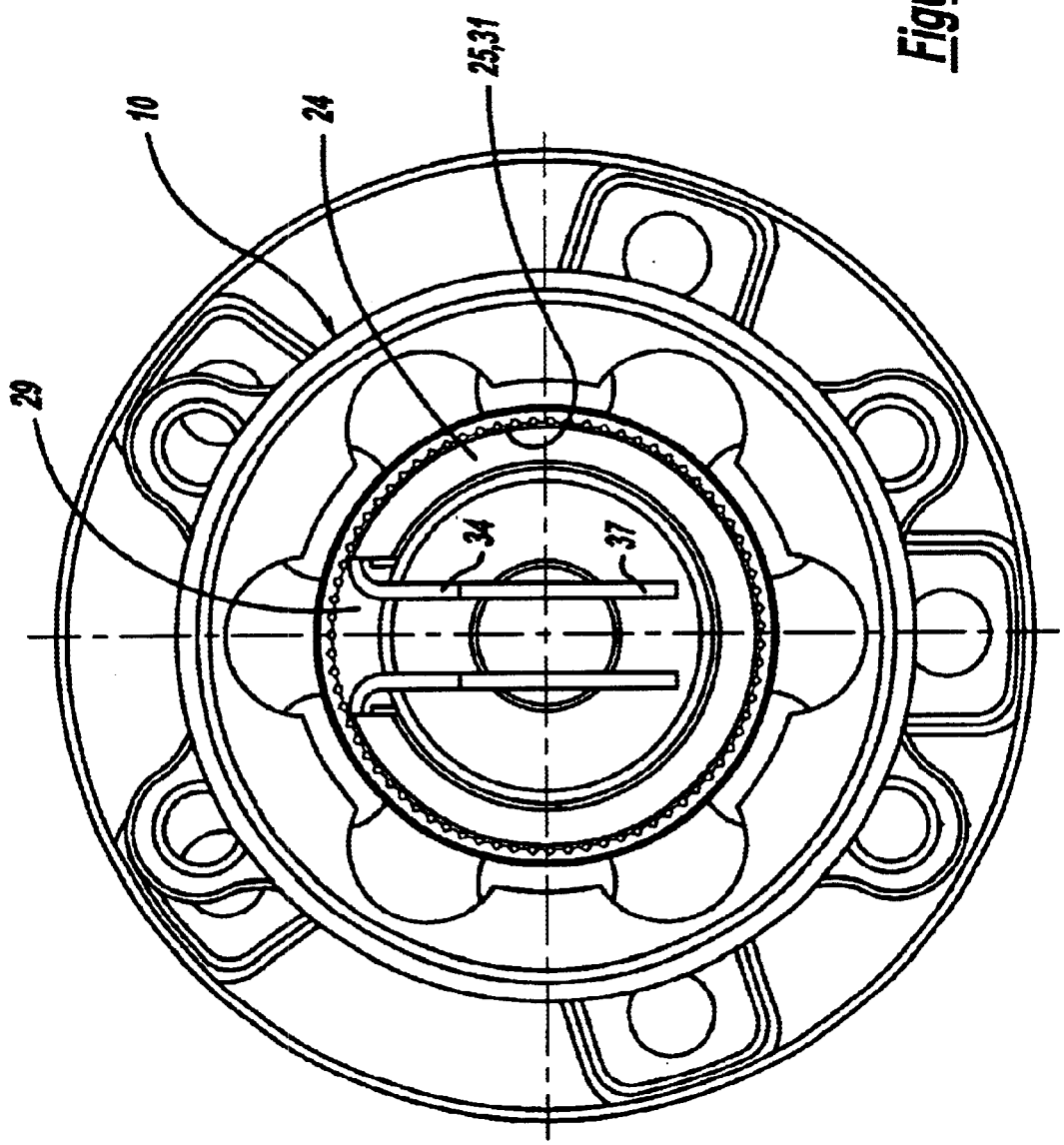
FIG. 2 is a view of the assembly of FIG. 1 in the direction of the arrow A in FIG. 1 with the internal diaphragm removed.

As shown in FIGS. 1 and 2, the flange 24 is provided with a slot 29. The slot extends radially of the flange from the outer surface 25 thereof to the bore 23. It also extends from the right-hand end of the flange 24 in FIG. 1 to the left-hand end 40 of the groove 33 in the flange. To assemble the parts 10 and 11, the ring 34 is first assembled on the flange 24 so that it is received in the groove 33. The arms 37 pass inwardly into the bore 23 through the slot 29.

By way of a pair of long-nosed pliers, not shown, inserted into the bore 23 from the left-hand end, the arms 37 can be moved towards one another thus to contract the circular part of the ring 35 so that the ring is wholly located in the groove 33. The outer race 10 can then be slid onto the flange 24 so that the splines 25 and 31 engage and the parts can be moved axially relative to one another until the grooves 32 and 33 are in alignment. The arms 37 can then be released with the result that the ring 34 assumes the position shown in FIG. 9 and the parts are secured together.

If desired, there may be an O-ring seal 41 interposed between the flange 24 and the adjacent end of the portion 30 to exclude dirt etc. from the inter-engaging splines 25 and 31 and the grooves 32 and 33. The cavity 42 in the outer race 10 is sealed by means of a diaphragm 43 and the left-hand end of the bore 23 by a removable cap 42a.

To remove the outer race 10 from the bearing assembly long-nosed pliers are again inserted into the bore 23 from the left-hand end, which is the wheel side on the vehicle, and the arms are gripped to contract the ring into the groove 33 thus allowing the outer race to be removed. This is a convenient method of assembly and disassembly since it is carried out from the wheel side of the assembly making it is possible to disassemble the bearing and the constant velocity joint outer race when the assembly is in situ on a vehicle. It is also possible to reduce the distance X shown in FIG. 1 between the center line of the constant velocity joint outer race and the bearing by this construction. The cap 42a keeps dirt out of the bore 23 and can be removed to insert pliers to compress the ring 34.

Figure 1A:
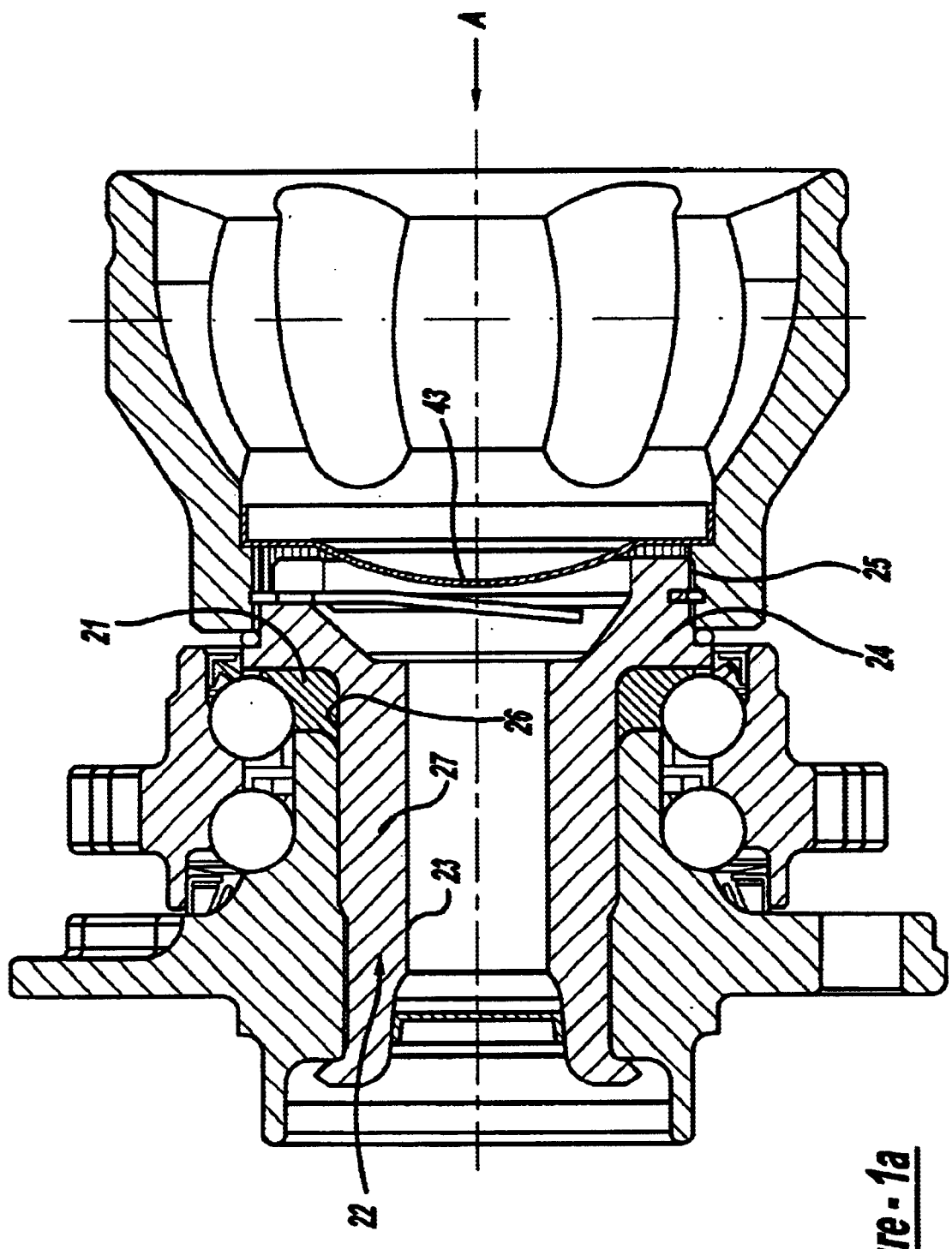
FIG. 1A is a vertical cross-section through a wheel bearing and outer race of a constant velocity joint assembly according to a second embodiment of the invention.

FIG. 1A differs from FIG. 1 only in that the inner race 20a in FIG. 1 which is formed on the securing element 22 is, in FIG. 1A, replaced by a separate inner bearing race 21 which is located on a seat 26 on the flange 24. The bearing 19 is pre-loaded via the bearing race 21 as the left-hand end of the securing element is swaged over at 28. Similar parts in the two figures are referred to by the same reference numerals.

Figure 3:
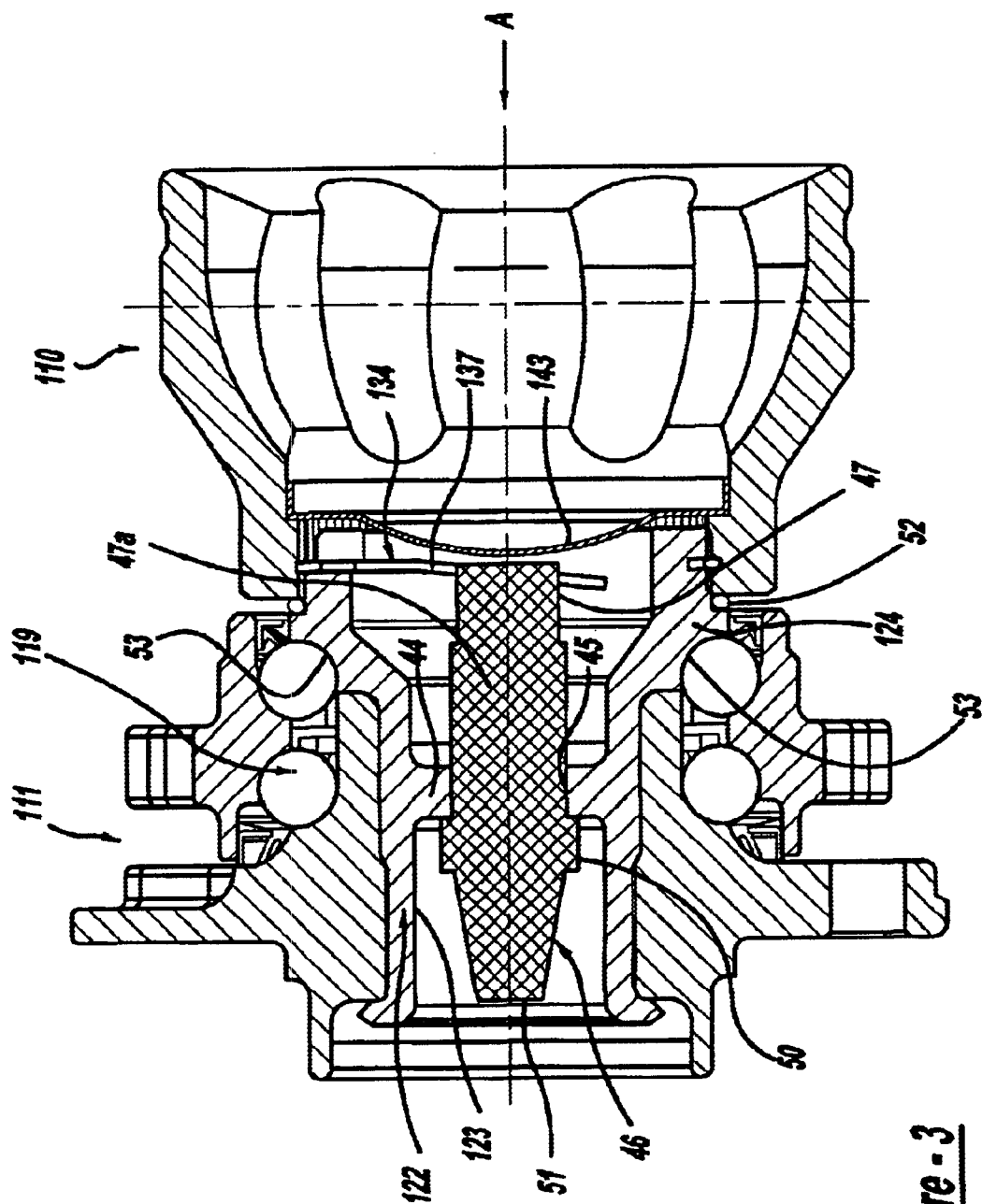
FIG. 3 is a cross-section similar to FIG. 1 according to a third embodiment of the invention.
Figure 4:
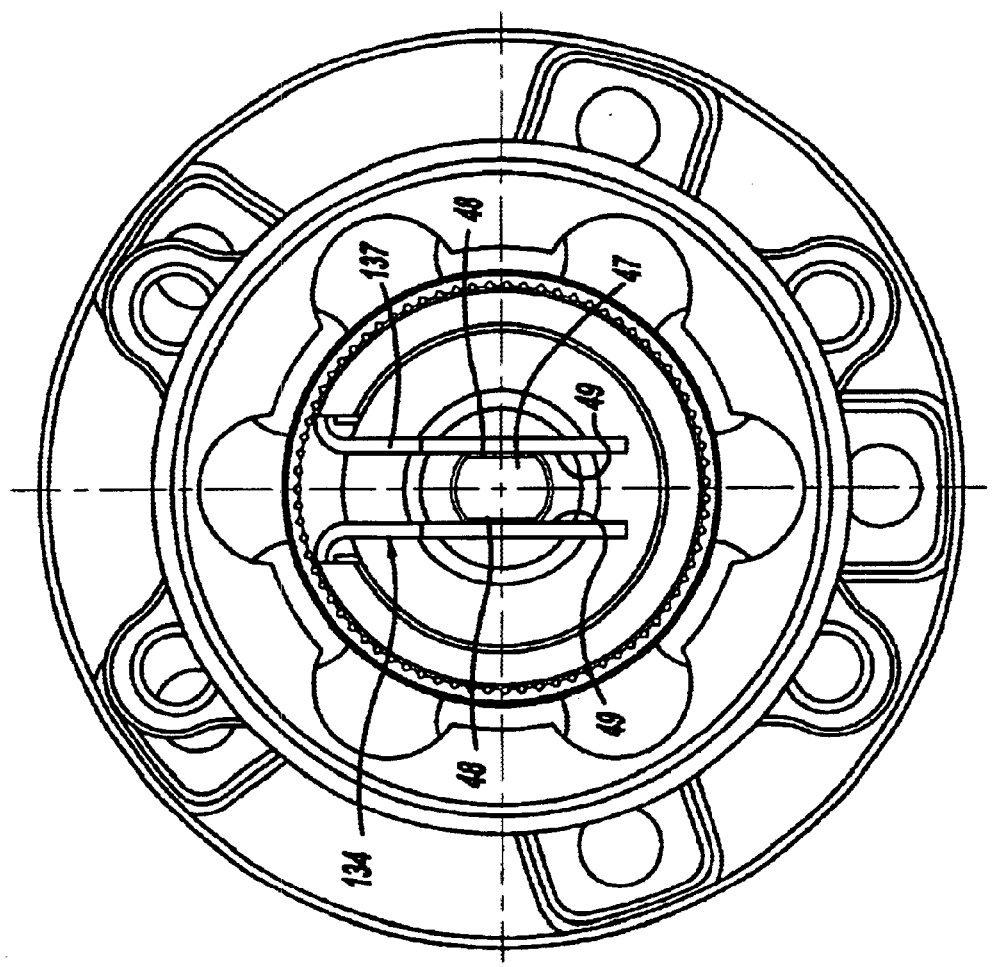
FIG. 4 is a view of the assembly of FIG. 3 in the direction of the arrow A in FIG. 3 with the internal diaphragm removed.

Referring now to FIGS. 3 and 4, there is shown an embodiment of the invention which differs from that shown in FIG. 1 by the provision of a holding element to hold the arms of the spring ring apart. The same reference numerals are therefore used in FIGS. 3 and 4 as in FIGS. 1 and 2, but are indexed by 100.

In FIGS. 3 and 4, the bore 123 in the securing element 122 has an internal flange 44 which provides a central passage 45 in which is received a holding element 46. The holding element 46 is made of a non-metallic material, such as plastic, which may be resilient and has a first part 47 which is received between the arms 137 as shown in FIG. 4. The part 47 has oppositely directed surfaces 48 which engage with inwardly opposed surfaces 49 on the arms 137.

A second part of the holding element is indicated at 47a, is cylindrical and is a tight fit in the passage 45. This part 47a has a flared portion 50 so that it is prevented from moving too far to the right in FIG. 3. A tab 51 is formed on the holding element so that it may be gripped.

The parts 110 and 111 are assembled as described in relation to FIGS. 1 and 2. However, when the parts 110 and 111 have been assembled and the ring 134 has expanded to the position shown in FIG. 9, the holding element 46 is inserted into the passage 45 so that the first part 47 is engaged between the arms 137 and holds them apart thus holding the ring in the position shown in FIG. 9.

In the embodiment of FIGS. 3 and 4 there is a sealing ring 52 similar to the ring 41 shown in FIG. 9 and the inner race 53 of the right-hand row of balls is formed directly on the hub.

Figure 7:
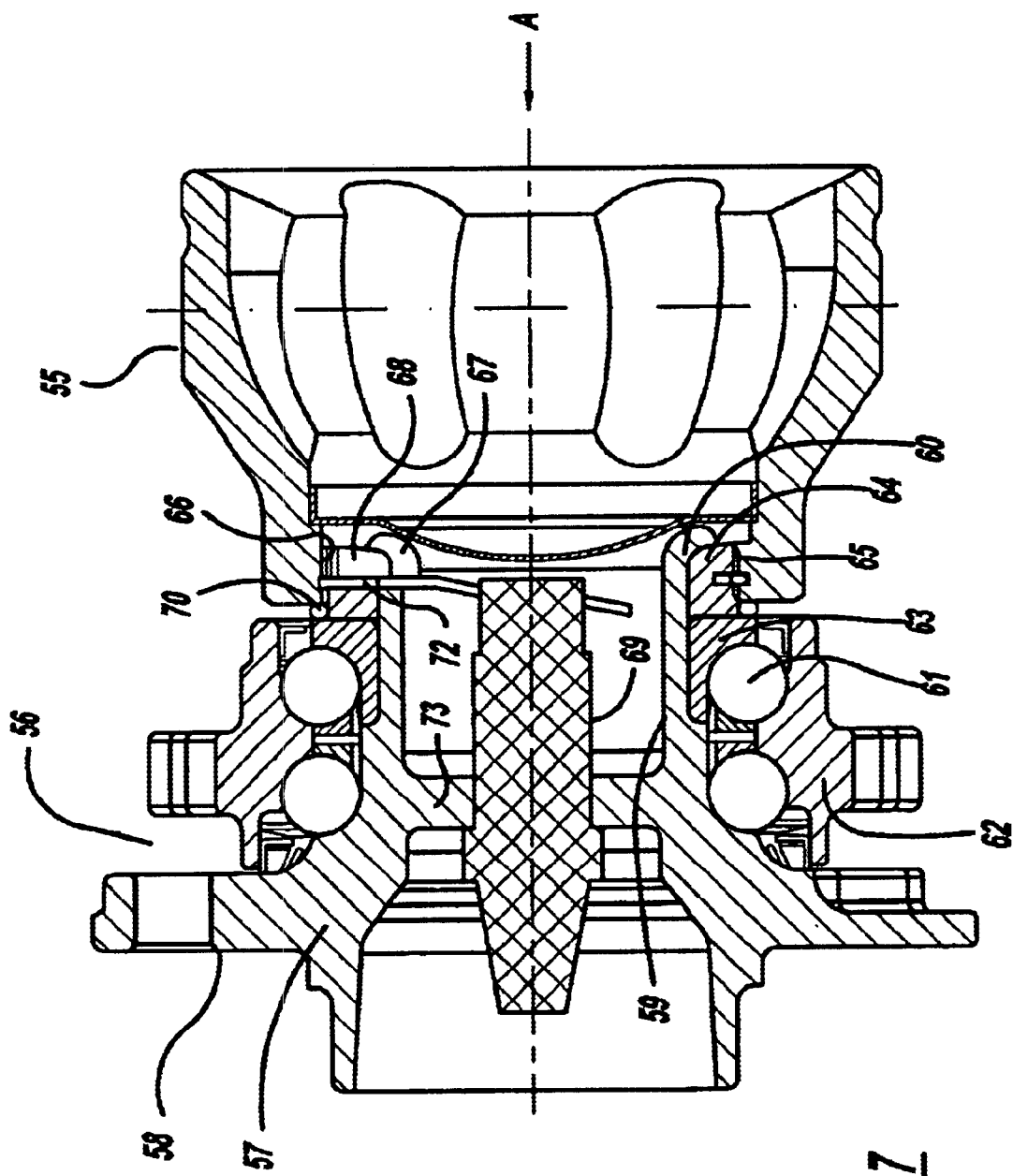
FIG. 7 is a cross-section similar to FIG. 1 according to a fourth embodiment of the invention.
Figure 8:
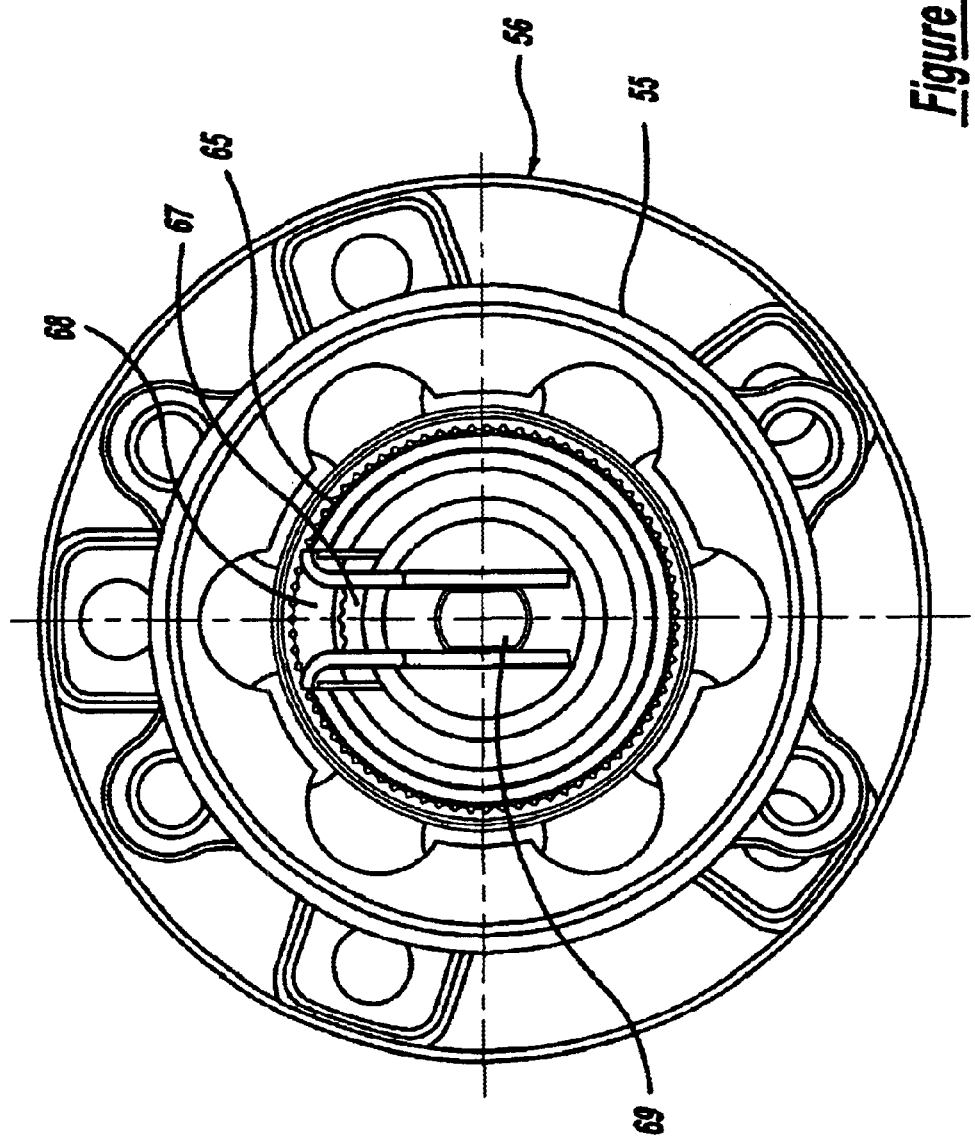
FIG. 8 is a view of the assembly of FIG. 7 in the direction of the arrow A in FIG. 7 with the internal diaphragm removed.

FIG. 7 shows a somewhat different construction to that shown in FIGS. 1 to 6. In this construction there is no securing element 22 or 122. Referring to FIGS. 7 and 8, the outer race of the constant velocity joint is indicated at 55 and the hub assembly at 56. The hub itself is indicated at 57 and has as before a flange 58 with bolts for receiving a road wheel. The hub has a bore 59 and at its right-hand end has an outwardly swaged portion 60. This swaged portion acts to pre-load a bearing 61 between the hub and a fixed portion 62 by pre-loading a separate inner race 63 as described above. Thus, the portion 60 engages the right-hand end of a securing ring 64 which engages the race 63. The external surface of the securing ring is splined at 65 to engage internal splines 66 on the neck portion of the outer race 55.

Both the outwardly swaged portion 60 and the securing ring 64 are slotted at 67 and 68 respectively. In this case, the internal groove such as 32 in FIG. 9, is formed in the outer race 55 as before but the external groove such as 33 is formed in the securing ring 64. The slot 68 extends from the right-hand end of the securing ring 64 to intersect with the external groove such as 33 in the securing ring 64.

Assembly of the parts is as described in relation to FIGS. 1 and 2 in that the spring ring 72 of the form shown in FIGS. 5 and 6 is mounted in the external groove in the securing ring 64. The spring ring 72 is then contracted by being held through the bore 59 by pliers as described above to contract the spring ring into the external groove. The outer race 55 of the constant velocity joint is then slid onto the splines 65 of the securing ring. The arms of the spring ring are released, and the ring takes the position such as shown in FIG. 9 in which it is both in the external groove 33 and in the internal groove 32. Referring again to FIG. 7, an O-ring seal 70 is provided between the securing ring 64 and the adjacent end of the neck of the outer race 55 of the constant velocity joint.

As in FIG. 3, an internal flange 73 is provided in the bore 59 which receives a holding element 69 which acts as described in relation to FIGS. 3 and 4. Holding element 69 also acts to seal the bore 59 by way of the O-ring 80 within a grooved portion of the cylindrical body of holding element 69. At one end of the holding element 69, a groove 82 and beveled edge 84 are provided to additionally secure the holding element and spring ring. Thus, as the holding element 69 is inserted between the arms of the spring ring, the arms are forced apart by beveled edge 84 until they engage the groove 82. In this case, the arms help to secure the holding element 69 within the bore 59.

Where an element has been swaged outwardly as described, it may be conveniently done by orbital forming which allows the bearing to be pre-loaded as described simultaneously with the formation of the outwardly swaged part.

The holding element described may be so constructed as to hold the arms of the spring ring in a position in which the ring is received wholly in the external groove in one position and then may take up another position to hold the arms apart as shown in the drawings.

The diaphragm 43, 143 such as described in relation to FIGS. 1, 1A and 3 may be so located as to engage the right-hand end of the flange 24, 124 when the internal and external grooves are in alignment thus assisting with assembly of the parts.

The spring ring used will normally be of rectangular cross-section as shown in FIG. 9 and will normally have a greater dimension radially than axially. The O-ring 41 may also be of rectangular cross-section.

Oil seals such as 71 in FIG. 1 may be installed on each side of the bearing 19 or 119.

Referring now to FIG. 10, there is shown an outer race 210 of a constant velocity joint and a motor vehicle wheel bearing assembly indicated generally at 211. A tubular securing element 222 is secured in a bore 216 of the assembly 211. The tubular securing element 222 has a bore 223 and, at its right-hand end, has a flange 224. The outer surface of which is splined 225. The bore 216 of the assembly 211 and the securing element 222 along a tubular part 227 also have inter-engaging splines 218. An o-ring 260 seals the joint splines 218 by engaging a groove and annular wall of the securing element 222 and bore 216 respectively.

The outer race 210 of the constant velocity joint includes a tubular neck portion 230 which is internally splined at 231. The splines 231 in the neck portion 230 of the outer race 210 engage the splines 225 of the flange 224. A seal 241 in the form of an o-ring seals the splined connection between the flange 224 and neck portion 230. The neck portion 230 of the outer race is also provided with an internal groove and the flange is provided with an external groove 233 similar to grooves 32, 33 of FIG. 9 for receiving a spring ring 234.

The spring ring 234 is shown in more detail in FIGS. 11 and 12. The ring includes a generally circular part 235 which is not a complete circle but has a gap 236. At the ends 238 of the circular part, the ring has arms 237, 239 which project generally radially inwardly. One arm 239 is significantly shorter than the other arm 237 which lies in a plane which is inclined to the plane which contains the circular portion as shown in FIG. 12. However, the arm 237 could be in the same plane as the rest of the ring. Arm 237 is also inclined toward the center of the ring such that near its end, it is located substantially at an axis Y passing through the center of the ring.

The assembly of the ring 234 onto the flange 224 is accomplished in a similar manner as that described with reference to FIGS. 1 and 2. In this regard, a slot 229 is again provided which extends from the right end of the flange 224 to the left end of the groove 233 within the flange 224. Engagement of the ring 234, however, differs from that described with reference to FIGS. 1 and 2.

By way of a forked tool 270 such as shown in FIG. 13, inserted into the bore 223 from the left side, the arm 237 can be engaged with the tool 270. Counterclockwise rotation of the tool 270 results in the short arm 239 reacting against the slot 229 and the longer arm 237 approaching arm 239 and, hence, reducing the gap 236. As a result, the ring 234 contracts and will be wholly located within the groove 233. The outer race 210 can then be slid axially with respect to the flange 224 until the inner groove of the outer race 210 is in alignment with the outer groove 233 of the flange 224. The arm 237 can then be released such that the ring 234 assumes the position shown in FIG. 9 and the two parts are secured together. A pair of needle-nose pliers can also be used to grasp the arm 237.

Disassembly occurs in a similar manner. Thus, the arm 237 is engaged with the forked tool 270 which is rotated to contract the ring 234 wholly within the groove 233 allowing the outer race 210 to be removed.

Locating the slot 229 of the flange 224 in the position shown in FIG. 10 permits the sealing connection to be made between the splines 225, 231. A seal 241 such as an o-ring can be placed in a groove within the flange 224 to contact an annular wall of the neck portion 230 of the outer race 210 to seal the interface connection.

Referring again to FIG. 10, the bore 223 in the securing element 222 includes an internal flange 244 which forms a central passage 245 in which there is received a sealing element 246. The sealing element 246 keeps dirt out of the bore 223 and can be removed for permitting tool access to the ring 234 for contraction. The sealing element 246 is generally cylindrical and is interference fit within the central passage 245. An o-ring 262 within a groove on the cylindrical body of the sealing element 246 sealingly engages the central passage 245. A flared portion 250 prevents the sealing element 246 from moving too far to the right in FIG. 10, and a tab 251 is formed on the sealing element so that it may be gripped for insertion and removal. Resilient flared members 264 may also be included which are sized slightly larger than central passage 245. Upon insertion to the point shown in FIG. 10, flared members 264 can engage the rear portion of the central passage to additionally secure the sealing member 246 within the passage 245. The sealing member 246 may advantageously be made of plastic.

Alternative embodiments for the sealing member 246 are also contemplated. For example, the central passage 245 and the cylindrical body of the sealing member may both be threaded.

From the foregoing, it can be seen that there has been brought to the art a new and improved method of securing members together by spring rings which has advantages over prior designs. While the invention has been described in connection with one or more embodiments, it should be understood that the invention is not limited to those embodiments. Thus, the invention covers all alternatives, modifications, and equivalents as may be included in the spirit and scope of the appended claims.

What is claimed is:

1. An assembly comprising an outer race of a constant velocity joint and part of a vehicle wheel bearing, wherein the outer race has a first bore and an internal groove in the bore, and wherein the wheel bearing part has a second bore with an open end, an external groove, and a slot extending radially from the second bore between an inner end open to the second bore and an outer end at an external surface of the bearing part, the slot extending axially between said external groove and said open end, the wheel bearing part and the outer race being held in an assembled position by a spring ring engaged in said internal groove and said external groove, the spring ring having, adjacent its ends, first and second arms which extend generally radially inward through said slot, said first arm being substantially longer than said second arm and inclined such that said first arm extends approximately through a center axis of said spring ring.

2. An assembly according to claim 1 comprising a sealing element located in the second bore, said sealing element comprising a cylindrical body having an annular groove formed therein, said groove containing a seal for sealingly engaging said second bore.

3. An assembly according to claim 2 wherein said sealing member comprises an annular first flange towards one end of said cylindrical body for seating said sealing element within said second bore.

4. An assembly according to claim 3 wherein said sealing member comprises a resilient second flange at the other end of said cylindrical body for securing said sealing element within said second bore.

5. An assembly according to claim 2 wherein said sealing element is made of plastic.

6. An assembly according to claim 1 comprising a threaded sealing element engaging threads within said second bore.

7. An assembly according to claim 1 wherein said wheel bearing part comprises a hub rotatably mounted in a fixed portion by rolling element bearings on an inner race, the hub having a vehicle wheel mount, the rolling element bearings being pre-loaded by an outwardly projecting part on one of the hub and an element securing the hub and the inner race together.

8. An assembly according to claim 7 wherein said wheel bearing part includes a tubular securing element received in a third bore in the hub, the securing element having a flange at one end of said second bore to pre-load the bearings and being swaged outwardly at the other end of said second bore to engage the hub.

9. An assembly according to claim 8 wherein an external surface of the securing element and the third bore in the hub have inter-engaging splines.

10. An assembly according to claim 9 wherein said external surface of the securing element includes an annular groove containing a seal for sealingly engaging said third bore.

* * * * *